United States Patent

[11] 3,547,012

[72] Inventors Stephen W. Amberg
St. James;
Douglas J. Burke, Smithtown; Nicholas J. Nicholas, Greenlawn, N.Y.
[21] Appl. No. 813,375
[22] Filed Feb. 26, 1969
Division of Ser. No. 616,578,
Patent No. 3,454,208
[45] Patented Dec. 15, 1970
[73] Assignee Owens-Illinois, Inc.
Toledo, Ohio
a corporation of Ohio by mesne assignments

[54] TWO-PIECE PLASTIC CONTAINER AND METHOD OF MAKING SAME
9 Claims, 15 Drawing Figs.
[52] U.S. Cl. ................................................ 93/36.5,
93/34, 93/36, 93/39.3, 93/94; 156/69
[51] Int. Cl. ........................................................ B31c 1/06,
B31b 1/66, B31b 1/88
[50] Field of Search ............................................. 93/36(MM),
36(.06), 36.5, 39(60), 39.1, 39.2,
39.3, 94(OFC), (PX), 34; 156/69

[56] References Cited
UNITED STATES PATENTS

| | | | |
|---|---|---|---|
| Re25,302 | 12/1962 | Allen | 93/39.1 |
| 1,155,734 | 10/1915 | Janisch | 93/39 |
| 2,003,494 | 6/1935 | Reynolds | 93/36 |
| 2,216,331 | 10/1940 | Swallow | 93/39.3 |
| 2,235,963 | 3/1941 | McGirr | 93/39.1X |
| 2,303,322 | 12/1942 | Bigger | 93/36.5X |
| 2,834,260 | 5/1958 | DeWiess | 93/36.5X |
| 3,157,339 | 11/1964 | Negoro | 93/36.5X |
| 3,303,760 | 2/1967 | Tobias | 93/39.1 |
| 3,388,639 | 6/1968 | Rumberger | 93/36 |
| 3,421,416 | 1/1969 | B-Petersen | 93/36 |
| 3,438,824 | 4/1969 | Balamuth | 156/69 |
| 3,475,243 | 10/1969 | Scalora | 156/69 |

FOREIGN PATENTS

| | | | |
|---|---|---|---|
| 3,432,986 | 3/1969 | | |
| 773,172 | 4/1957 | Great Britain | 93/94(OFC) |

Primary Examiner—Wayne A. Morse, Jr.
Attorney—Ward, McElhannon, Brooks & Fitzpatrick ABSTRACT: A method of fabricating a two-piece container of noncellular plastic material, such as high impact polystyrene, oriented polystyrene, acrylonitrile-butadiene-styrene, cellulose acetate or other cellulosic esters, rigid vinyl chlorides, or acrylic copolymers, wherein a precut blank of such material is first printed upon, and then circumferentially folded and solvent sealed along its marginal edges to form a sidewall member. A preformed bottom member is solvent sealed to the sidewall member, and a second solvent seal is applied along the line of juncture between the sidewall and bottom members to cause swelling and direct sealing together at what would otherwise be crevice locations therealong. The exterior surface of the container is subjected to infrared heat to relieve tension strains therein. See specification for particular solvent composition and particular techniques for applying same, particular residence times, temperatures and techniques for applying infrared heat, and other specific details.

PATENTED DEC 15 1970

Inventor
STEPHEN W. AMBERG
DOUGLAS J. BURKE
NICHOLAS J. NICHOLAS

By

Attorney

PATENTED DEC 15 1970
3,547,012
SHEET 2 OF 3
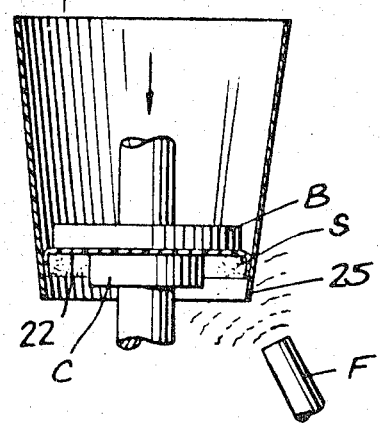
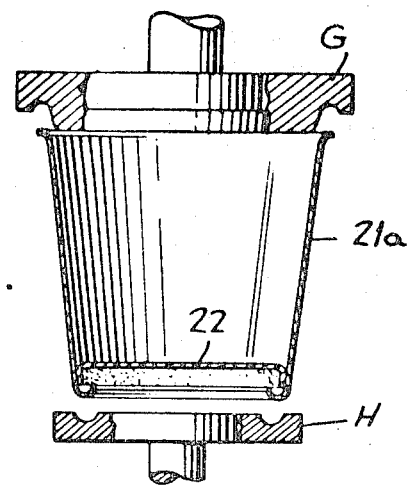
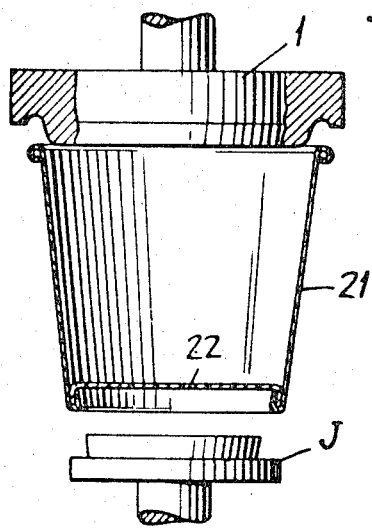
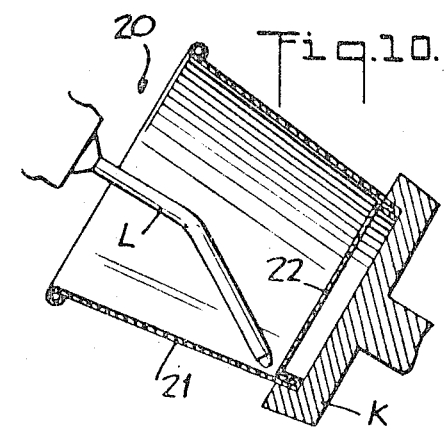
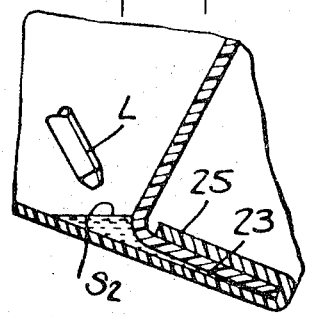
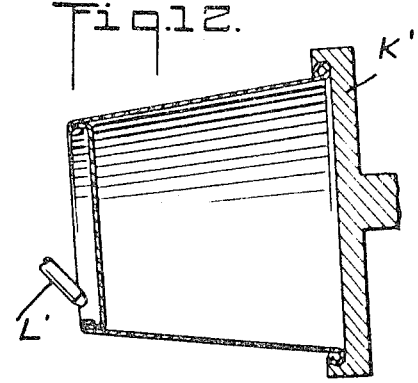
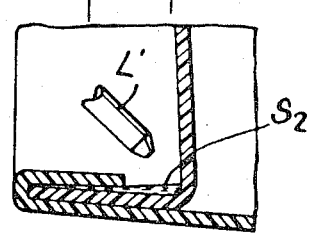
STEPHEN W. AMBERG
DOUGLAS J. BURKE
NICHOLAS J. NICHOLAS

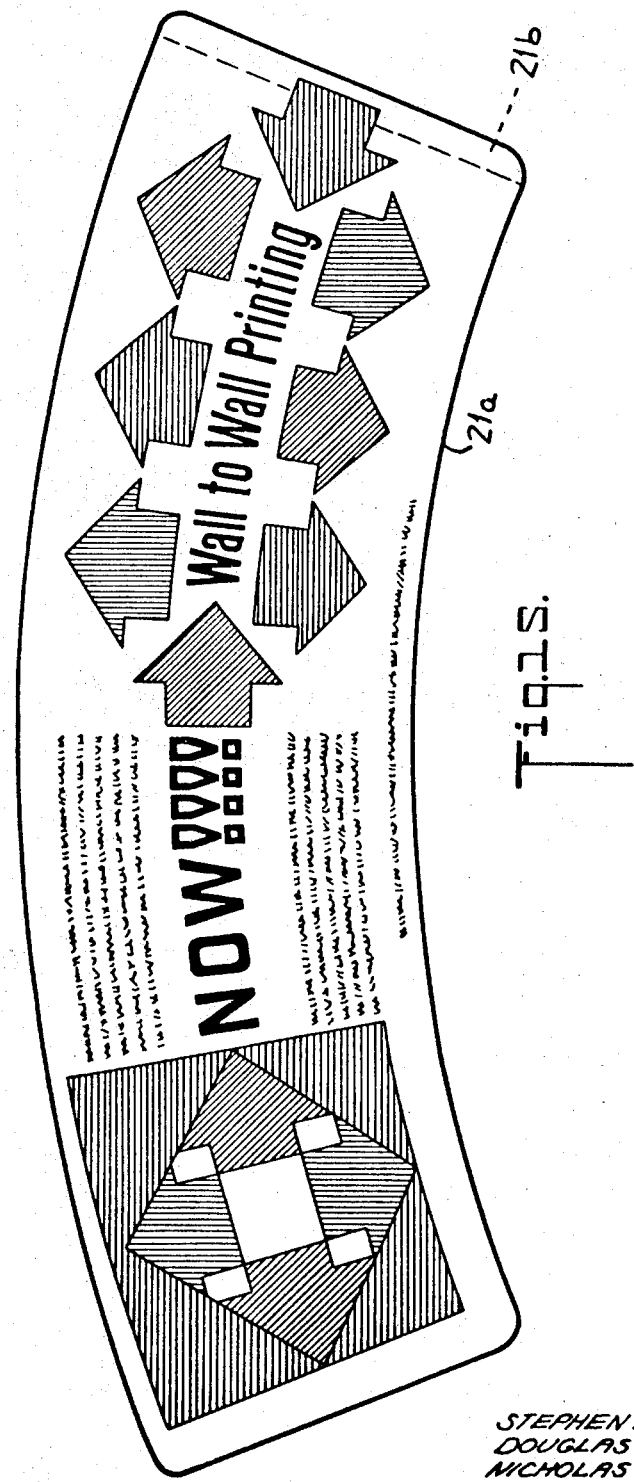

TWO-PIECE PLASTIC CONTAINER AND METHOD OF MAKING SAME

This application is a division of copending application Ser. No. 616,578, filed Feb. 16, 1967, now U.S. Pat. No. 3,454,208, granted July 8, 1969.

BACKGROUND OF THE INVENTION

With the advent of plastic containers, these were made in one-piece comprising continuous sidewall and bottom, those comprising unfoamed plastic material being suitably formed by thermoforming from a sheet of material, by injection molding, etc., and those made of foam plastic material being made by thermoforming from a sheet material or by casting or the like. In such one-piece plastic containers, the only way that printing material such as designs, lettering, etc., could be applied was by holding individual containers by suitable means such as a mandrel and applying the printed material individually to the container sidewall. This procedure is slow and costly and makes it almost prohibitive to produce such containers on a commercial price basis.

SUMMARY OF THE INVENTION

According to the present invention, the plastic container is fabricated from a sidewall member and a bottom member, both formed of sheet plastic material, which results in two major benefits: (1) it permits the use of standard machinery and techniques well known in the art for producing two-piece paperboard cups which entails a substantial saving in the cost of equipment, and (2) it provides a further great advantage that the sheet from which the plastic side member is formed may be printed in rolls as in the manner of making paperboard containers and in this way the sidewall blanks may be printed so that the printed surface will extend substantially the full height and full circumferential extent of the sidewall which would not be possible with one-piece plastic containers and the printing of the sidewall blanks in sheet form before the container is fabricated may be accomplished with a far greater speed and substantial saving in cost than possible in the printing of a sidewall of one-piece plastic containers.

The sidewall member is provided by a body blank cut from a sheet of plastic material containing a plurality of blanks, preferably printed before cutting. The blank is folded circumferentially with opposite overlapped marginal edges secured together in a side seam effected by softening the plastic with a solvent therefor and applying pressure until the overlapped plastic edges are sealed and intimately united. In the presently preferred embodiment, the bottom member is provided with a downwardly extending peripheral flange disposed between the interior of the lower end of said body member and an adjacent inwardly and upwardly extending end portion. The contiguous surfaces of said bottom flange and lower marginal edge of said body member are softened by a solvent for said plastic and pressure is applied to hold the engaging soft surfaces together to seal and intimately unite the same. It is contemplated that other configurations may be used for the cooperating portions on the lower end of said sidewall and bottom member periphery instead of the specific configuration herein described, the essential feature requires only that the contiguous portions present cooperating areas which may be sealed and intimately united.

The side seam thus formed provides a dependable liquid tight and airtight seal. However, due to the difficulty of effecting adequate and uniform pressure throughout the peripherally extending bottom flange and engaged body end portion, the initial sealing and uniting of the parts together does not provide a dependable seal. We have found that this may be remedied by adding a limited amount of a supplemental solvent to the peripheral end seam at the joint between the body member and bottom member throughout the circumferential extend of said joint. This supplemental solvent is added after the initial solvent sealing and uniting operation and serves to perfect the sealed peripheral end seams. We have found that for the post sealing operation the supplemental solvent should be slower acting than the solvent initially used, as more particularly pointed out hereinafter.

Due to the stresses imposed on the sheet plastic material, it has been noted that crazing or cracking of the sidewall 21 of the fabricated container develops. Such stresses are due to the tension in the outer portion of the sidewall 21. We have found that this may be relieved after the container has been completed without adversely affecting the structure as a whole by subjecting the outer surface to a suitable temperature sufficient to heat said sidewall exterior only to about one-half of the thickness of the plastic material. This is acceptably accomplished by subjecting the entire external surface of the container sidewall to heat from an infrared heater by rotating the container as it is moved linearly past said infrared heater.

In the presently preferred form of the invention, high impact polystyrene is used as the plastic material but the invention may be advantageously used with other noncellular plastic sheet materials such as oriented polystyrene, acrylonitrile-butadiene-styrene (ABS), cellulose acetate and other cellulosic esters, rigid vinyl chlorides, and acrylic copolymers. Naturally, certain solvents are more effective in solvent sealing some of the above listed plastics than others. Also, a very active solvent can be blended with a less active solvent to give varying degrees of attack. The thickness of the material to be employed will depend in a large measure upon the size and intended use of the containers and the particular plastic used. For very small containers, it is contemplated that material as thin as 0.005 inches can be used and for larger containers, such as used for tubs, material as thick as 0.100 inches could be employed.

Since the apparatus employed in carrying out the method of our invention and producing the container of our invention is utilized and well known in the production of two-piece paperboard containers and the operations are generally comparable, only such portions of said apparatus will be shown and described as will be necessary to teach those skilled in the art to practice our invention.

Referring to the drawings:

FIG. 7 is a side elevational view, partly in section, diagrammatically showing the positioning of the bottom member in the container body shell; FIG. 8 is a similar view diagrammatically showing the first step in precurling the rim of the body shell member and turning in the bottom of the shell;

FIG. 9 is a similar view diagrammatically showing the final rimming of the mouth of the sidewall and the rolling in of the bottom of the sidewall;

FIG. 10 is a side elevational view, partly in section, diagrammatically showing the application of supplemental solvent to the interior of the rolled in bottom joint;

FIG. 11 is a somewhat enlarged fragmental sectional view showing the application of the supplemental solvent to the interior of the bottom joint;

FIGS. 12 and 13 are views similar to FIGS. 10 and 11 showing the application of solvent to the exterior of the rolled in bottom joint;

FIG. 14 is an enlarged fragmental sectional view showing the sealed exterior bottom joint; and FIG. 15 is a plan view of a printed blank for the sidewall member showing the extensive area to which the printing may be applied.

Figures 1, 2:
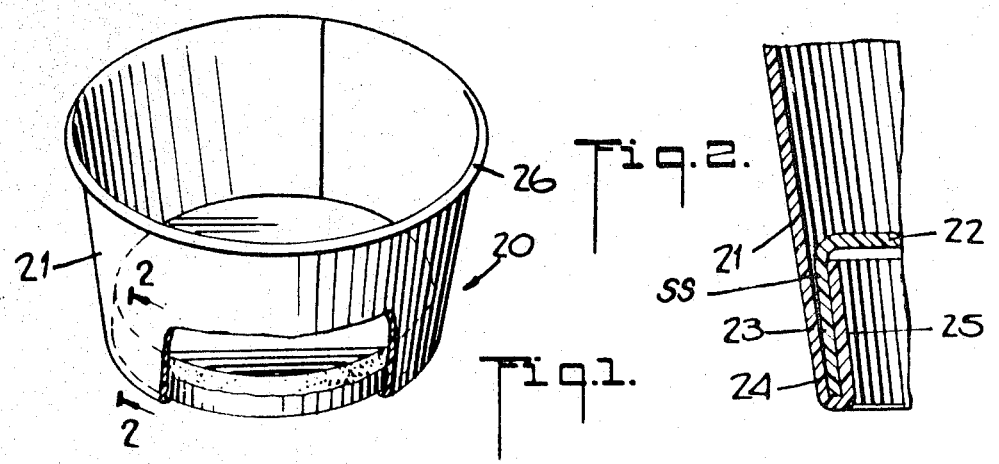
FIG. 1 is a top perspective view, partly in section, of a container embodying our invention.
FIG. 2 is a segmental sectional view taken at 2–2 of FIG. 1.
Figures 3, 4:
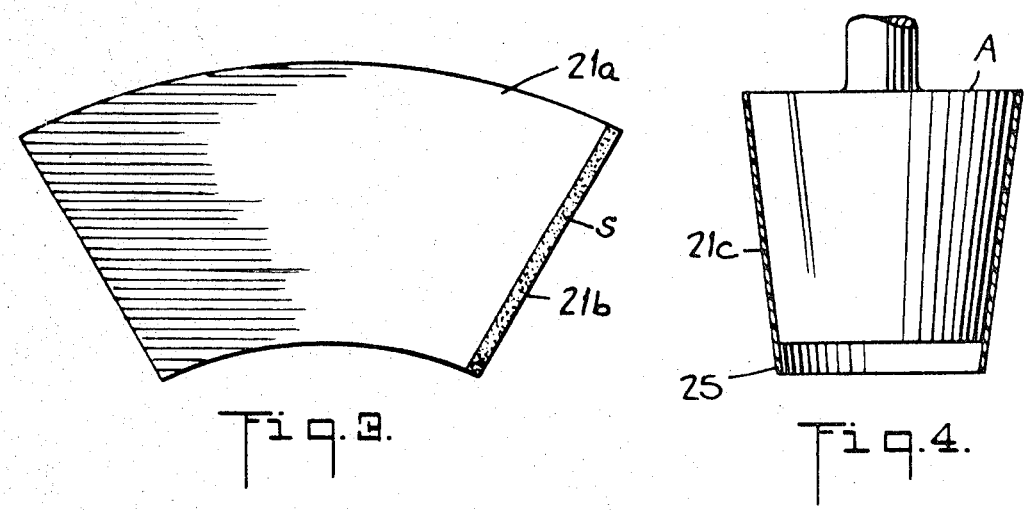
FIG. 3 is a plan view of the sidewall blank before bending to form the sidewall shell.
FIG. 4 is a side elevation of a mandrel showing the manner of forming the sidewall shell member.

Referring to the drawings, and more particularly to FIGS. 1, 2 and 3: A completed container made in accordance with a preferred embodiment of the invention is designated in general as 20. In this embodiment the container is of the frustoconical type comprising a sidewall body member 21 and a bottom member 22 provided with a down-turned peripheral skirt or flange 23 disposed within the lower end portion 24 of the body member 21 with the lower marginal end portion 25 of the body folded inwardly and upwardly along the inner face of the flange 23. The container is provided with the usual rolled rim or lip 26. The sidewall body member 21 and the bottom member are each formed from sheet plastic material and are intimately joined together by solvent sealing of the plastic material to provide a liquidtight and airtight peripheral bottom seal in the manner to be more particularly described hereinafter.

By way of example, the embodiment of the invention to be specifically described below will be a 16 oz. container made of a side member and a bottom member of 0.015 inches thick high impact polystyrene. The preferred solvent which we have found entirely satisfactory for effecting the sealing and uniting of the sidewall seam and initial sealing and uniting of the bottom seam is methylene chloride. In general, chlorinated solvents are preferred for safety reasons but if proper safety precautions are taken, flammable solvents or a blend of flammable and nonflammable solvents may be used.

Before the sidewall blanks are cut from the sheet plastic, the desired design is printed. This permits printing the design on the area of the blank (see FIG. 15) which will correspond to substantially the full height and circumferential extent of the container.

Figure 6:
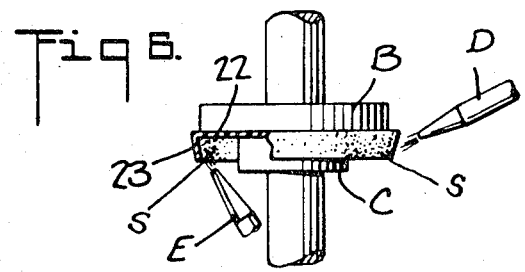
FIG. 6 is a somewhat diagrammatic view showing a formed receptacle bottom member and the presently preferred manner of applying solvent thereto.

After printing the sheet of plastic, blanks 21a (FIG. 3) are cut and stacked in a blank magazine (not shown) forming part of the machine. As each blank is fed from the magazine, the plastic solvent S is applied along one longitudinal marginal edge as at 21b by suitable means such as by being fed under a rotating gravure applicator roll. The blank enters folder mechanism where it is automatically registered and folded at room temperature (70° F.) circumferentially around one mandrel such as A (FIG. 4) which is mounted on a rotating turret of a plurality of mandrels to overlap the opposite longitudinal marginal edge with the solvent S disposed therebetween to provide the side seam and a seam clamp mechanism (not shown) provided on the turret descends against the side seam to apply pressure for effective sealing of the side seam. The seam is held under pressure for about 3½ seconds which is sufficient to assure solvent sealing and intimately uniting of the plastic material to provide a liquidtight and airtight seam. The body member shell 21c is transferred from the winding mandrel into a holder (not shown) carried on an intermittently rotating turret of an assembler machine. This turret is equipped with a plurality of such holders. To facilitate forming the bottom member 22 from relatively stiff sheet plastic material, the sheet is heated to about 130° F. by passing it over a plate heated to about 160°—180° F. The bottom member 22 is then cut and drawn from the heated sheet to form the skirt portion 23. The bottom member 22 is held (FIG. 6) between members B and C conveniently carried as a part of the assembler machine on that portion known as the bottom turret. While so held, the peripheral flange 23 of the bottom is coated interiorly and exteriorly with said solvent S as by means of spray nozzles designated D and E (FIG. 6). The bottom member 22 with its flange thus coated is then placed into the body 21c (FIG. 7) in correct relation to the smaller end. At this station the lower marginal edge 25 of the shell 21c is subjected to heated air at a temperature of about 250° F. blown thereagainst by a tube F to facilitate the turn-in of their this portion of the shell at the next step. The temperature of this air may be suitably varied for other plastic materials and other thicknesses.

The bottom turret members B and C are removed and the assembly of the shell 21c and bottom 22, while still positioned in the assembler cup, are moved to the next assembler station (FIG. 8) where precurling of the rim of the sidewall member 21c is effected by a rim die member G, which in the preferred embodiment is heated to a temperature in the range of approximately 250°±20° F., to facilitate this operation. It is noted that for different size of containers where the thickness of material will differ and/or where other plastic sheet material is used, this temperature should be varied accordingly. At the same time that the rim is being precurled, the bottom edge 25 of the shell is turned in by means of the member H which is not heated since the marginal edge of the sidewall 21c has been heated with hot air supplied through the pipe F (FIG. 7) and has been softened by the solvent S (FIG. 6).

The partially assembled container, while still positioned in the assembler holder, is moved to the next station (FIG. 9) where final rimming of the upper end of the sidewall member 21 is effected by means of die I which in the present embodiment is heated at a temperature in the range of 330°—360° F. It is noted that for different size containers having different material thickness and/or a different type of plastic, this temperature should be varied accordingly. At this station, at the same time that the final rimming operation is effected, the bottom marginal edge 25 of the sidewall member, which was previously turned in as indicated in FIG. 8, is now rolled in by means of a tool J, which is not heated since this marginal edge has previously been softened by the heat applied as shown in FIG. 7, and by the solvent.

It is noted at this point, relative to the time element, that from the time of insertion of the bottom 22 in the sidewall member 21c including the turn-in operation illustrated in FIG. 8, as well as the complete rolling operation illustrated in FIG. 9, a total of only 1½ seconds has elapsed. The completely assembled container is then ejected.

The means of forming the sidewall seam as above described provides a liquidtight and airtight seam due to the solvent sealing of the parts together. However, under high-speed operating conditions, and especially where the plastic material has a thickness of the order used in the preferred embodiment herein described, it has been found that it is difficult to consistently assure a liquidtight and airtight bottom seal when reliance is placed entirely upon the application of solvent and a pressing of the parts together as above described. In other words, it has been found that small crevices are apt to occur in the bottom peripheral seal and in order to assure the formation of a dependable peripheral seal, the following method has been devised to provide a supplemental seal.

A controlled quantity of a supplemental solvent for the plastic material is applied to the juncture between the sidewall bottom end and the periphery of the end member. The application should be such that the supplemental solvent flows into the joint and any crevices present and is absorbed by the plastic surfaces causing them to swell and soften to a "tack" point so that a direct adhesion of the surfaces results. We have found that this supplemental solvent should be slower acting than the solvent initially used. For example, the supplemental solvent, herein designated as S2, which we have found entirely satisfactory for this post sealing operation is a 50—50 percent by volume mixture of vythene (1-1-1-trichlorethane) and methylene chloride. This supplemental solvent is applied by relative motion between the solvent and container, preferably while the axis of the latter is tipped at an angle to the horizontal so as to assure contact of the supplemental solvent and said juncture. This may be effected by rotating the container relative to a spray nozzle or rotating a spray nozzle relative to the container. By way of example, we have found the following procedure to be satisfactory.

The assembled container 20 (FIG. 10) is positioned in a suitable holder K with the longitudinal axis of the container held at an angle of about 15° above the horizontal while a small amount of the solvent S2 is poured into the container through the spout L while the holder K rotates the container at a speed of about 15 r.p.m. for 3 to 5 revolutions to thus distribute the solvent evenly over the bottom corner formed at the juncture between the sidewall 21 and bottom 22. The amount of solvent and speed of rotation are critical in order to effect a proper seal but to avoid having the solvent attack the plastic material to an extent where it will weaken the container or actually go through the sidewall, while on the other hand, insufficient solvent will not provide a proper supplemental seal. The amount of supplemental solvent required will be proportional to the bottom seam circumference and we have found that in the 16 oz. container herein described by way of example, the amount of said solvent should be 0.25±0.05 ml.

In general, the speed of rotation of the container should not be sufficiently great to cause the solvent, due to centrifugal force, to "creep" up the sidewall of the container but should remain pocketed at the juncture of the shell and the bottom until it has been absorbed by the plastic sidewall and bottom flange to swell and soften the contiguous surfaces and provide the supplemental seal, designated in FIG. 2 as SS, on a somewhat exaggerated scale. Any amount of centrifugal force would tend to drive the solvent away from the axis of rotation and thus up the sidewall. Therefore we desire the lowest rate of speed to allow the solvent to flow by gravity down into the bottom crevice. The rotation of the container is only to spread the solvent around the circumference of the bottom joint and its speed must be such that the resulting centrifugal force on the solvent is less than the force of gravity. Otherwise the liquid would not flow down into the bottom joint which, by design, tapers inward toward the axis of rotation. After sufficient solvent absorption and evaporation, the container could be held in any position. It is noted that if the solvent is deposited in gradual streams at spaced intervals, the speed of rotation may exceed 300 r.p.m. since the solvent would in effect be deposited in spaced spirals from which it would be gradually spread to cover the desired area.

Instead of depositing the supplemental sealing solvent 52 within the container between the container body and bottom as described in connection with FIG. 10, or in addition thereto if desired, the supplemental sealing solvent S2 may be deposited on the underside of the container between the inturned bottom margin 25 and the bottom flange 23 as indicated in FIGS. 12, 13 and 14. The resulting supplemental seal being indicated in FIG. 14, on a somewhat exaggerated scale, as SS'. This is particularly important where the inturned marginal end 25 of the body member is not folded up the full width of the bottom flange 23.

MODIFIED APPLICATION OF SOLVENT FOR PERIPHERAL BOTTOM SEAM

Figure 5:
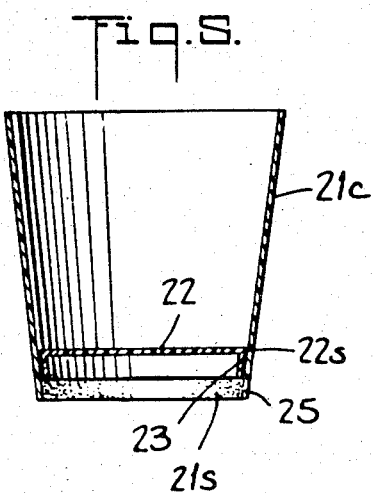
FIG. 5 is a side elevation of a completed sidewall shell member.

Instead of applying the plastic solvent S to both the interior and exterior faces of the bottom flange 23, as described in connection with FIG. 6, the solvent may be applied to the interior of the sidewall blank along the lower marginal edge so that when the blank is folded into the shell 21c as shown FIG. 4, the inner face of the marginal edge 25 will be coated as shown at 21S in FIG. 5, and in such case the flange 23 of the bottom member 22 will be coated only on its outer surface as shown at 22S. The solvent applied to the interior of the marginal end 25 will of course come into engagement with the interior of the peripheral flange 23 of the bottom 22 so that in effect the solvent will be applied to the inner and outer surfaces of the flange 23 disposed between the inturned lower end and the oppositely disposed portion of said shell.

After the supplemental solvent sealing SS has been applied to the peripheral bottom flange as shown in FIGS. 2 and/or 14, the fabrication of the container is complete but the sidewall 21 of the container is subject to crazing or cracking due to tension strains as heretofore mentioned. These strains are localized adjacent the outer surface and extend for about one-half the thickness of the sidewall. It is known in general that strains in plastic material may be relieved by annealing; but such annealing of a fabricated container of the character described presents difficulties. For instance, subjecting the entire container to heat would deleteriously affect the structure and may cause it not only to be weakened but to become deformed or even collapse or fall apart. We have found that such tension strains may be safely relieved or removed by subjecting the exterior surface of the sidewall and adjacent strata where the strains are more or less localized to a controlled temperature without adversely affecting the container structure.

By way of example, the presently preferred procedure set forth below has proven entirely satisfactory.

The container is suitably held, as by means of a holder such as K (FIG. 10) and is rotated about its axis while moved in a linear direction past an infrared heater having a wave length of about 3.2 microns and a density of 22 watts to expose substantially the entire external surface of the sidewall to said heat. The duration of such exposure should be about 5 seconds, it being noted that since the container rotates relative to the heat source, less a than one-half of its circumference is under its influence. The other half is what might be called the "dark side". Therefore, the 5 seconds of time interval means that the container must be rotated to allow every portion of its periphery to be in the general direct heat rays for at least 5 seconds, during which the surface should be within 1 inch to 2 inch distance from the heat source. As the distance is increased, more exposure time would be required. This will serve to raise the temperature of the exterior surface of the sidewall to about 210°±10° F. (for high impact polystyrene material of about 0.015 inch thickness) which effectively heats the outside surface and adjacent strata to about one-half of its thickness without substantially affecting the other parts of the container. At this exterior temperature the interior temperature will be about 190°±10° F. For materials of other thicknesses the same temperature is used but the time is decreased or increased in accordance with a decrease or increase in think thickness.

Heating the sidewall as above described will largely remove the odor of the solvent, but such removal will be augmented by passing the container through an air tunnel which will also serve to cool the containers so that they may be more speedily handled and packed.

Having thus described our invention with particularity with reference to presently preferred embodiments thereof, it will be obvious to those skilled in the art, after understanding our invention, that various changes and modifications may be made therein without departing from the spirit and scope of our invention, and we aim in the appended claims to cover such changes and modifications as fall within the scope of the invention.

We claim:

1. A method of making a fabricated plastic container which comprises applying along an edge of a precut blank of noncellular plastic sheet material corresponding to a side seam to be formed a solvent for said plastic material, folding said blank circumferentially so as to bring the opposite edges in overlapping relationship with said solvent coating disposed therebetween, holding said overlapped portions against each other while said solvent softens the plastic material and causes the overlapped edges to be solvent sealed and intimately united together to form a shell having a side seam, positioning a preformed bottom member of noncellular plastic sheet material and having a peripherally disposed surface area adjacent the lower end of said shell in adjacent cofacing relation with a peripherally extending surface area of the end of said shell and thereby providing initially contiguous areas, a solvent for said plastic materials being disposed on at least one of said peripheral surface areas, holding said peripheral surface areas against each other to solvent seal and intimately unite said contiguous areas directly to each other, and thereafter applying a quantity of a supplemental solvent for said plastic materials along the line of and throughout the circumferential extent of the juncture between said bottom member and said shell so as to cause said supplemental solvent to flow into crevices between said cofacing areas to be absorbed by the cofacing plastic surfaces causing them to swell and soften and intimately unite together to form a supplemental seal, thereby providing an effective and dependable peripherally continuous liquidtight and airtight seal between the shell and bottom member, said method further comprising printing on said sheet material prior to said initial step of applying a solvent along a side seam edge of said precut blank of the sheet material.

2. A method according to claim 1 in which said sheet material is polystyrene and said solvent for said side seam and the first applied solvent for the cofacing surfaces of the shell and bottom member are chlorinated solvents.

3. A method according to claim 1 in which said solvent for said side seam and the first applied solvent for the cofacing surfaces of the shell and bottom member are methylene chloride and said supplemental solvent is a mixture of substantially equal parts by volume of vythene (1-1-1-trichlorethane) and methylene chloride.

4. A method according to claim 1 in which said bottom plastic member has a downwardly extending peripheral flange within the lower end of said shell and disposed between an inturned lower end and the oppositely disposed portion of said shell, and in which the solvent for said plastic material is applied to the inner and outer surfaces of said downwardly extending peripheral flange of the preformed bottom plastic member, and which further comprises thereafter turning in the lower end of said shell within said bottom flange, and applying said supplemental solvent for said plastic material to the interior of said container at a location adjacent to said juncture and while positioning said container with its longitudinal axis at an angle of about 15° above the horizontal and while rotating said container at a speed of about 15 r.p.m.

5. A method according to claim 1 which includes as a preliminary step printing said blanks when they are in their noncut flat sheet material form.

6. A method of making a fabricated plastic container which comprises applying along an edge of a precut blank of noncellular plastic sheet material corresponding to a side seam to be formed a solvent for said plastic material, folding said blank circumferentially so as to bring the opposite edges in overlapping relationship with said solvent coating disposed therebetween, holding said overlapped portions against each other while said solvent softens the plastic material and causes the overlapped edges to be solvent sealed and intimately united together to form a shell having a side seam, positioning a preformed bottom member of noncellular plastic sheet material and having a peripherally disposed surface area adjacent the lower end of said shell in adjacent cofacing relation with a peripherally extending surface area of the end of said shell and thereby providing initially contiguous areas, a solvent for said plastic materials being disposed on at least one of said peripheral surface areas, holding said peripheral surface areas against each other to solvent seal and intimately unite said contiguous areas directly to each other, and thereafter applying a quantity of a supplemental solvent for said plastic materials along the line of and throughout the circumferential extent of the juncture between said bottom member and said shell so as to cause said supplemental solvent to flow into crevices between said cofacing areas to be absorbed by the cofacing plastic surfaces causing them to swell and soften and intimately unite together to form a supplemental seal, thereby providing an effective and dependable continuous liquidtight and airtight seal between the shell and bottom member, said method further comprising applying heat to the outer surfaces of said shell to anneal the same whereby otherwise existing tension therein is relieved, said heat being applied to said outer surface at a temperature of from about 200° F. to about 220°q0 ql F.

7. A method according to claim 6 wherein said heat is applied by rotating the container about its axis while moving the container in a linear direction past an infrared heater.

8. A method according to claim 7 wherein said plastic sheet material of said shell is high impact polystyrene having thickness on the order of about 0.015 inches, said infrared heater has a wave length of about 3.2 microns and a density of about 22 watts, and said container is so rotated and moved while being spaced away from said heater a distance within about 2 inches and at rates of rotation and movement whereby each portion of its said outer surface is exposed to said heat for a period of about 5 seconds.

9. A method according to claim 7 wherein said container has substantially 16 oz. capacity, and said quantity of supplemental solvent is from about 0.20 to about 0.30 ml.